United States Patent [19]

Katayama et al.

[11] Patent Number: 5,708,308
[45] Date of Patent: Jan. 13, 1998

[54] APPARATUS FOR PROTECTING AUTOMOBILE AGAINST UNAUTHORIZED OPERATION

[75] Inventors: Kazuyori Katayama; Yasuo Naito, both of Tokyo, Japan

[73] Assignee: Mitsubishi Denki Kabushiki Kaisha, Tokyo, Japan

[21] Appl. No.: 646,926

[22] Filed: May 8, 1996

[30] Foreign Application Priority Data

Jun. 5, 1995 [JP] Japan ................... 7-138132

[51] Int. Cl.$^6$ .................................................. H04L 9/32
[52] U.S. Cl. ................. 307/10.5; 307/10.3; 307/10.4; 180/287; 235/382.5; 340/825.31; 340/825.34
[58] Field of Search .................... 307/9.1–10.8; 180/287, 167; 340/425.5, 426, 825.31, 825.34; 364/423.098, 423.099, 424.037, 424.045; 235/128, 380, 382, 382.5; 123/198 B, 198 DB, 198 DC; 380/3

[56] References Cited

U.S. PATENT DOCUMENTS

| | | | |
|---|---|---|---|
| 4,438,426 | 3/1984 | Adkins | 180/287 |
| 4,965,460 | 10/1990 | Tanaka | 307/10.2 |
| 4,990,906 | 2/1991 | Kell | 340/825.31 |
| 5,079,435 | 1/1992 | Tanaka | 307/10.2 |
| 5,172,094 | 12/1992 | Stadler | 340/426 |
| 5,513,105 | 4/1996 | Krones | 307/10.5 |
| 5,532,522 | 7/1996 | Dietz | 307/10.5 |
| 5,554,891 | 9/1996 | Shimizu | 307/10.2 |
| 5,559,491 | 9/1996 | Stadler | 340/426 |
| 5,583,383 | 12/1996 | Denz | 307/10.2 |
| 5,600,723 | 2/1997 | Woodall | 340/825.34 |

FOREIGN PATENT DOCUMENTS 54-141598  11/1979  Japan.
5296129    11/1993  Japan.

Primary Examiner—Richard T. Elms
Assistant Examiner—Peter Ganjian
Attorney, Agent, or Firm—Sughrue, Mion, Zinn, Macpeak & Seas, PLLC

[57] ABSTRACT

An antitheft apparatus for an automobile includes an engine starting key storing an identification code allocated inherently, a code reading circuit for reading out the identification code from the engine starting key inserted in a key cylinder installed on the automobile, a code collating circuit for collating the identification code supplied from the code reading circuit with a verification code stored previously, and an engine start decision circuit for enabling engine starting operation when the identification code coincides with the verification code, while upon occurrence of a discrepancy between the identification code and the verification code, for enabling the engine starting operation only when a door or accelerator pedal of the automobile is actuated in a predetermined manner. The automobile can be operated even when the key is lost or damaged and the identification code is unavailable.

11 Claims, 12 Drawing Sheets

APPARATUS FOR PROTECTING AUTOMOBILE AGAINST UNAUTHORIZED OPERATION

BACKGROUND OF THE INVENTION

1. Field of the Invention

The present invention generally relates to an apparatus for protecting an automobile against unauthorized operation thereof. More particularly, the invention is concerned with an antitheft apparatus which allows the authorized user of an automobile to operate it with a manipulation procedure which is known only to the authorized user of the motor vehicle even when the authentic engine start key is unavailable or damaged.

2. Description of Related Art

Antitheft apparatuses for automobiles known heretofore are generally so arranged that an engine operation starting switch can be turned on by using a mechanical cylinder key (hereinafter also referred simply to as the key) delivered to the user who is authorized to drive the automobile for protecting the automobile against unauthorized operation for a wrong purpose such as theft. However, because such key can be copied or forged relatively easily, the antitheft function as desired can not be satisfactorily achieved.

As an approach for reinforcing the antitheft function, there has already been proposed an arrangement wherein information identifying a key specific to an automobile of concern is transmitted to a key cylinder assembly mounted on the automobile, wherein the operation for starting the engine of the automobile is permitted when verification of the information shows authenticity thereof, as is disclosed, for example, in Japanese Unexamined Patent Application Publication No. 15141/1992 (JP-A-4-15141).

More specifically, in the antitheft apparatus of the structure disclosed in the publication mentioned above, the cylinder assembly mounted on the automobile is provided with a rotor coil mounted on an annular core disposed around a key insertion slot formed in the key cylinder, while a key coil wound on a rod-like member is embedded inside the key. Thus, by inserting the key into the key cylinder, a magnetic circuit is formed. Through the medium of the magnetic circuit, transfer of the information is performed between the key and the key cylinder. Only when the information originating in the key coincides with the information stored in association with the key cylinder for the purpose of verification is an engine starting operation enabling signal sent to an engine starting system of the automobile.

Owing to adoption of a peculiar key structure incorporating the information storage/sender as mentioned above, the antitheft apparatus for the automobile can ensure high secrecy and security of the identification information and is effective for protecting the automobile against unauthorized operation such as theft. However, in case the authorized user should lose his or her key or when the key is damaged, it is necessary for the authorized user to obtain a new key from a supplier, which usually takes time. It goes without saying that during a period in which the new key is unavailable, the user can not operate the automobile, which is a great inconvenience to the user.

SUMMARY OF THE INVENTION

In the light of the state of the art described above, it is an object of the present invention to provide an apparatus for protecting an automobile against unauthorized operation, or an antitheft apparatus for an automobile, which allows an authorized user to start engine operation of the automobile by manipulating the automobile or a part thereof in a specific manner which only the authorized user knows, even when his or her key is lost or damaged, while ensuring the antitheft function such as mentioned above.

In view of the above and other objects which will become apparent as the description proceeds, there is provided according to an aspect of the present invention an apparatus for protecting an automobile against unauthorized operation, which apparatus includes an engine starting key incorporating a storage means for storing an identification code allocated inherently to the automobile, a socket means mounted on the automobile for receiving the engine starting key, a code reading means provided in association with the socket means for reading out the identification code from the engine starting key inserted in the socket means, a code collating means for collating the identification code supplied from the code reading means with a verification code stored previously, a manipulation detecting means for detecting whether or not the automobile is manipulated in a predetermined manner, to thereby generate a predetermined manipulation signal when the automobile is manipulated in the predetermined manner, an engine starting means for starting operation of an engine of the automobile, and an engine start decision means for enabling the engine starting means to start operation of the engine in response to an output of the code collating means which indicates that the identification code coincides with the verification code, while when the output of the code collating means indicates discrepancy between the identification code and the verification code, the engine start decision means enables the engine starting means to start operation of the engine only when the predetermined manipulation signal is generated by the manipulation detecting means.

With the structure of the antitheft apparatus described above, operation of the automobile can be realized notwithstanding a defect in the ID verification function of the engine key without degrading the antitheft function while ensuring the secrecy and security of the engine starting manipulation procedure.

In a preferred mode for carrying out the invention, the apparatus may be so arranged that upon a decision of discrepancy between the identification code and the verification code, the engine start decision means generates the engine start enable signal when at least two different types of automobile manipulation signals are issued by the manipulation detecting means.

By virtue of the arrangement described above, the engine can be started after identifying the authorized user without fail.

In another preferred mode for carrying out the invention, the engine start decision means may be so arranged as to impose a limited time to generation of each of the automobile manipulation signals to thereby generate an engine start enable signal to the engine starting means only when each of the automobile manipulation signals is generated within the limited time.

With the structure of the antitheft apparatus described above, operation of the automobile can be realized notwithstanding of defect in the ID verification function of the engine key without degrading the antitheft function while ensuring more positively the secrecy and security of the engine staring manipulation procedure.

According to another aspect of the invention, there is provided an automobile protecting apparatus which includes an engine starting key incorporating a storage means for storing an identification code allocated inherently to the automobile, a socket means mounted on the automobile for receiving the engine starting key, a code reading means provided in association with the socket means for reading out the identification code from the engine starting key inserted in the socket means, a code collating means for collating the identification code supplied from the code reading means with a verification code stored previously, a manipulation detecting means for detecting whether or not the automobile is manipulated in a predetermined manner, to thereby generate a predetermined manipulation signal when the automobile is manipulated in the predetermined manner, a timer means for setting a predetermined time limit, an engine starting means for starting operation of an engine of the automobile, and an engine start decision means for enabling the engine starting means to start operation of the engine in response to an output of the code collating means which indicates that the identification code coincides with the verification code, while when the output of the code collating means indicates discrepancy between the identification code and the verification code, the engine start decision means enables the engine starting means to start operation of the engine only when the predetermined manipulation signal is generated by the manipulation detecting means within the predetermined time limit set at the timer.

By virtue of the arrangement described above, the engine can be started after the authorized user has been identified without fail.

In yet another preferred mode for carrying out the invention, the number of times the automobile can be manipulated in the predetermined manner after decision of discrepancy between the identification code and the verification code may be limited to a predetermined number.

Owing to this arrangement, the reliability of the apparatus can further be enhanced because the engine is prevented from starting accidentally through manipulation performed at random.

In still another preferred mode for carrying out the invention, the manipulation of the automobile and the time limit can be determined arbitrarily and the engine start decision means can be set to match.

By combining appropriately the limited time (or time limit) and the manipulation of the automobile in a such manner as described above, the driver can select the optimal procedure for the engine stating operation.

In a further preferred mode for carrying out the invention, content of the manipulation of the automobile and the time limit can be determined arbitrarily and the engine start decision means can be set when coincidence between the identification code and the verification code is decided.

Owing to this arrangement, only an authorized person can set the contents or procedure for manipulation of the automobile for enabling the engine starting operation, thereby further enhancing reliability of the apparatus.

In a yet further preferred mode for carrying out the invention, the number of times the content of the manipulation and the time limit can be changed may be limited to a predetermined number.

By restricting the number of times the setting and alteration of the manipulation procedure and the time limit can be performed, as described above, reliability of the apparatus can be enhanced more significantly.

According to a further aspect of the invention, there is provided the automobile protecting apparatus mentioned above which includes an engine starting key incorporating a storage means for storing an identification code allocated inherently to the automobile, a socket means mounted on the automobile for receiving the engine starting key, a code reading means provided in association with the socket means for reading out the identification code from the engine starting key inserted in the socket means, a code collating means for collating the identification code supplied from the code reading means with a verification code stored previously, a manipulation detecting means for detecting whether or not the automobile is manipulated in a predetermined manner, to thereby generate a predetermined manipulation signal when the automobile is manipulated in the predetermined manner, an engine starting means for starting operation of an engine of the automobile, wherein the engine starting means incorporates the manipulation detecting means, a communication means for transmitting output of the manipulation detecting means, and an engine start decision means for enabling the engine starting means to start operation of the engine in response to an output of the code collating means which indicates that the identification code coincides with the verification code, while when the output of the code collating means indicates a discrepancy between the identification code and the verification code, the engine start decision means enables the engine starting means to start operation of the engine only when the predetermined manipulation signal is received from the manipulation detecting means.

With the arrangement described above, a large number of manipulation signals available for the engine starting system can be made use of, whereby need for providing additional signal input means can be excluded. Thus, the apparatus can be implemented simply and inexpensively.

In a still further preferred mode for carrying out the invention, the manipulation detecting means may include door switch means provided in association with a door of the automobile for detecting opening and closing of the door.

Furthermore, the manipulation detecting means may include throttle position sensor for detecting actuation of an accelerator pedal of the automobile.

The door switch and the throttle position sensors represent objects which are very convenient for the manipulation.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
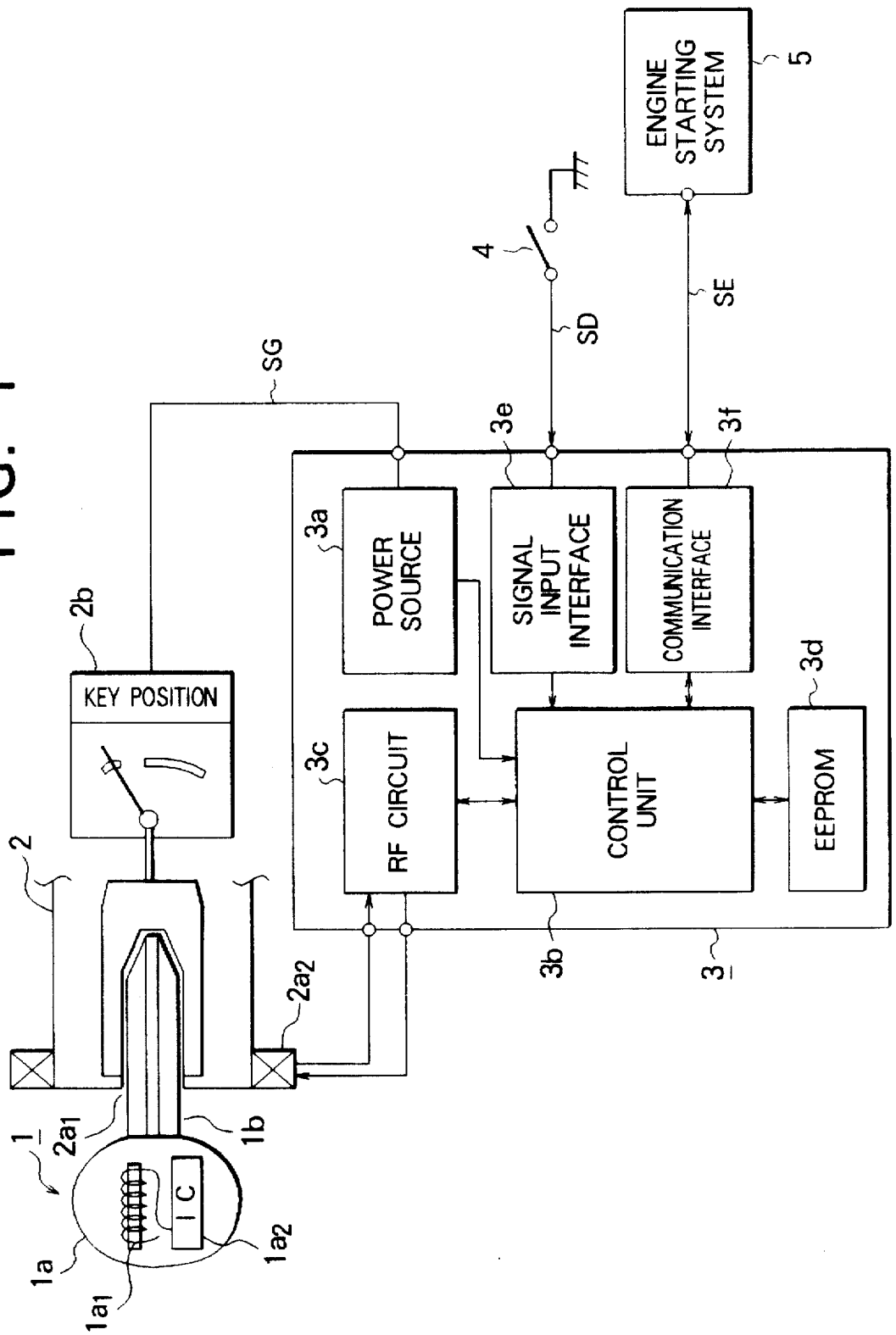
FIG. 1 is a schematic diagram showing a structure of an antitheft apparatus for a motor vehicle according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

FIG. 1 is a schematic diagram showing a structure of an antitheft apparatus for protecting a motor vehicle or automobile against unauthorized operation according to a first embodiment of the present invention. Referring to the figure, a cylinder key 1 used for starting an internal combustion engine (hereinafter also referred to simply as the engine) of an automobile has a manipulating head $1a$ which incorporates as embedded therein a key coil antenna $1a_1$ serving for both functions of an induction coil in which a voltage is induced under the effect of an electromagnetic induction and an antenna for performing radio communication and an integrated circuit or IC $1a_2$ which includes a capacitor for charging an induced current and functions as a power supply source. Furthermore, the IC $1a_2$ includes a nonvolatile memory (e.g. electrically erasable programmable read-only memory or EEPROM in abbreviation, not shown) for storing an identification code referred to as the ID code) which is inherently allocated to the cylinder key 1, and a control circuit for signal transmission and reception.

On the other hand, a key cylinder 2 mounted on the automobile in a cab thereof is provided with a keyhole $2a_1$ into which a blade $1b$ (main body of the cylinder key 1) is inserted, wherein there is provided around the keyhole $2a_1$ a key cylinder coil antenna $2a_2$ serving as an induction coil for inducing a voltage in the key coil antenna $1a_1$ of the key 1 in the inserted state thereof and an antenna for performing a signal communication with the key coil antenna $1a_1$ under the effect of the electromagnetic induction. By inserting the key 1 into the key cylinder 2 and rotating it, an ignition key switch $2b$ is closed to thereby transmit a power-on signal SG and other signals such as command signals to individual control units of the motor vehicle and an ID code verification/control module 3 described below.

The ID code verification/control module 3 is put into operation in response to the power-on signal SG generated by the ignition key switch $2b$. As can be seen in FIG. 1, the ID code verification/control module 3 is comprised of a power source $3a$ for supplying a voltage to various constituent parts of the ID code verification/control module 3 in response to the power-on signal SG inputted from the ignition key switch $2b$, a control unit $3b$ for controlling operation of the ID code verification/control module 3, a radio frequency circuit (hereinafter referred to as the RF circuit) $3c$ for sending a high frequency signal for electromagnetic induction to the key cylinder coil antenna $2a_2$ under the control of the control unit $3b$ while receiving the ID code signal sent out from the key 1 through the medium of the key cylinder coil antenna $2a_2$ to thereby transfer the ID code signal to the control unit $3b$, an electrically erasable programmable read-only memory (hereinafter referred to as the EEPROM in abbreviation) $3d$ which stores therein a verification code for confirming the authenticity of the ID code sent from the cylinder key 1 and an engine start program which is executed in dependence on the result of the matching or collation of the ID code with a verification code, as mentioned above, a signal input interface $3e$ for receiving an ON/OFF signal SD from a door switch 4 and inputting the signal SD to the control unit $3b$ as an external signal, and a communication interface $3f$ for allowing communication for transmitting the engine start enable signal SE from the control unit $3b$ to an engine starting system 5.

Next, description will turn to operation of the antitheft apparatus according to the instant embodiment of the invention. For starting the engine of the automobile, the operator or driver inserts the cylinder key 1 into the key cylinder 2 and rotates the key 1 for starting the engine. As a result of this, the contact of the ignition key switch $2b$ is charged over to a position at which the power-on signal SG is applied to the ID code verification/control module 3 for triggering operation of the power source circuit $3a$, whereby the output voltage of the power source $3a$ is supplied to the control unit $3b$.

When the control unit $3b$ is put into operation in response to the supply of electric power from the power source $3a$, the RF circuit $3c$ sends a high frequency signal to the key cylinder coil antenna $2a_2$ or excitation thereof, as result of which an electric current or voltage is induced in the key coil antenna $1a_1$ incorporated in the cylinder key 1 under the effect of electromagnetic induction exerted by the key cylinder coil antenna $2a_2$.

Upon application of the induced voltage to the IC $1a_2$, the capacitor incorporated in the IC $1a_2$ is electrically charged to serve as a power source for the IC $1a_2$. During period in which the capacitor is being charged, the coil antennas $1a_1$ and $2a_2$ are used as the antennas for signal transmission/reception. To this end, sending of the high frequency signal from the RF circuit $3c$ to the key cylinder coil antenna $2a_2$ is stopped under the control of the control unit $3b$. The time at which the sending of the high frequency signal is stopped is detected by a control circuit incorporated in the IC $1a_2$. During the period in which the sending of the high frequency signal is stopped, the IC $1a_2$ reads out the ID code inherently allocated to the key 1 from the non-volatile memory (e.g. EEPROM, not shown) and converts it to a signal suited for transmission, which signal is then transmitted to the key cylinder coil antenna $2a_2$ via the key coil antenna $1a_1$ in a contactless manner by making use of electromagnetic induction.

The signal mentioned just above is then received by the RF circuit 3c and digitized by the control unit 3b to be subsequently stored as the ID code, which is then matched or collated with a verification code stored previously in the EEPROM 3d by the control unit 3b. When the matching results in coincidence between both the codes, an engine start enable signal SE is transmitted to the engine starting system 5 via the communication interface 3f. On the other hand, when the collation mentioned above results in a discrepancy, an engine start disable signal is transmitted to the engine starting system 5 via the communication interface 3f.

In response to reception of the engine start enable signal SE from the ID code verification/control module 3, the engine starting system 5 allows the engine to start normally, while upon reception of the engine start disable signal, the engine starting system 5 inhibits the engine from being started. In this manner, only the driver who uses the authentic key in which the ID code coinciding with the verification code stored in the EEPROM 3d of the ID code verification/control module 3 is allowed or authorized to start the engine. In this conjunction, it should be appreciated that because the ID code is stored in the manipulating head portion of the cylinder key 1, an attempt at starting the engine with a key having a forged blade (corresponding to that designated by 1b) will result in failure since the matching or comparison between the ID code and the verification code can not be effectuated because the ID code is stored in the manipulating head of the key 1. In other words, the antitheft function can be used for protecting the automobile against wrongful use and theft.

However, there may arise a situation wherein even with the authentic cylinder key 1, sending of the ID code becomes impossible because of a fault or damage of the key 1 or IC $1a_2$ incorporated therein. In that case, the code matching or collation mentioned previously will result in a discrepancy. However, so long as the blade 1b is normal, it is possible to rotate the cylinder key 1 to thereby close the ignition key switch 2b for inputting the power-on signal SG to the ID code verification/control module 3.

Under the circumstances, these control unit 3b may be so arranged as to receive an ON (door opened)/OFF (door closed) signal SD from a door switch 4 via the signal input interface 3e when discrepancy between the verification code and the inputted ID code is detected. To this end, the control unit 3b is previously so programmed that the engine start enable signal can be generated when the engine starting operation is performed in a generally unusual manner or state in which the door is left opened (with the door switch 4 being closed or "ON") regardless of whether the code matching or collation results in discrepancy. Thus, when the user manipulates the cylinder key 1 in the door-opened state, the ON signal SD is inputted to the control unit 3b. In this manner, when it is decided by the control unit 3b that the ON (door-opened) signal SD is inputted from the door switch 4 after the decision of discrepancy or failure in the code verification, the engine start enable signal SE is sent to the engine starting system 5 via the communication interface 3f.

Next, the engine start enable decision procedure will be described in more detail by reference to a flow chart shown in FIG. 2.

Figure 2:
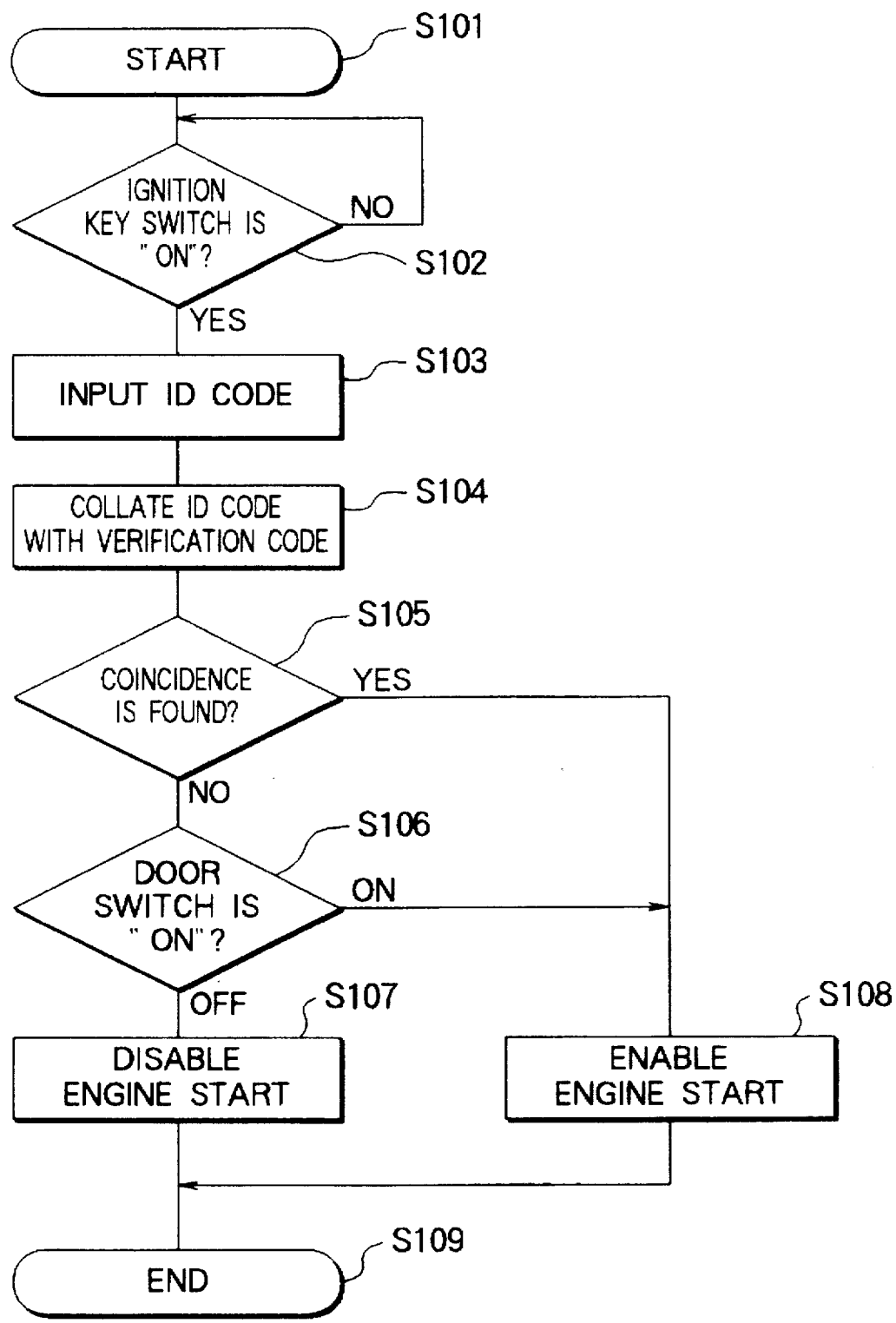
FIG. 2 is a flow chart for illustrating operation of the theft apparatus for a motor vehicle according to the first embodiment of the invention.

When the driver gets in the automobile and inserts the cylinder key 1 into the key cylinder 2, the decision procedure is started (step S101 in FIG. 2). Subsequently, it is decided in a step S102 whether or not the power-on signal SG is generated in response to a change in the contact position of the ignition key switch 2b as brought about by rotation of the cylinder key 1. Unless the power-on signal SG is inputted, this check of the input of the power-on signal SG is repeated.

When it is decided that the power-on signal SG is inputted as a result of change of the contact position in the ignition key switch 2b, the processing proceeds to a step S103 to effectuate the power supply to the cylinder key 1 as well as read-out operation of the ID code from the cylinder key 1 through the electromagnetic coupling operation. Next, in a step S104, the ID code as read out is compared with the verification code stored in the internal EEPROM 3d.

The result of the matching or comparison performed in the step S104 is checked in a step S105. In case the result of the comparison shows discrepancy, it is then checked whether or not the ON (door-opened) signal SD indicating that the door is opened is inputted from the door switch 4. At this juncture, when the ON signal SD is not inputted, indicating that the door is in the closed state, the processing proceeds to a step S107 where an engine start disable or inhibit command signal is issued to the engine starting system 5.

On the other hand, when the ON signal SD indicating the door-opened state is inputted from the door switch 4 in the step S106, the processing proceeds to a step S108 where the engine start enable signal SE is sent to the engine starting system 5. Further, when the check of the result of the comparison in the step S104 shows coincidence between the inputted ID code and the verification code in the step S105, then the processing proceeds to a step S108 where the engine start enable signal SE is sent to the engine starting system 5. Then, the processing proceeds to a step S109, whereupon execution of the engine start procedure according to instant embodiment of the invention comes to an end.

As is apparent from the foregoing, even when the ID code can not be outputted from the cylinder key 1 due to a fault thereof, operation of the engine of the automobile can be started by manipulating the cylinder key 1 in the condition known only to the user, i.e., when the door of the automobile is opened.

Embodiment 2

Figure 3:
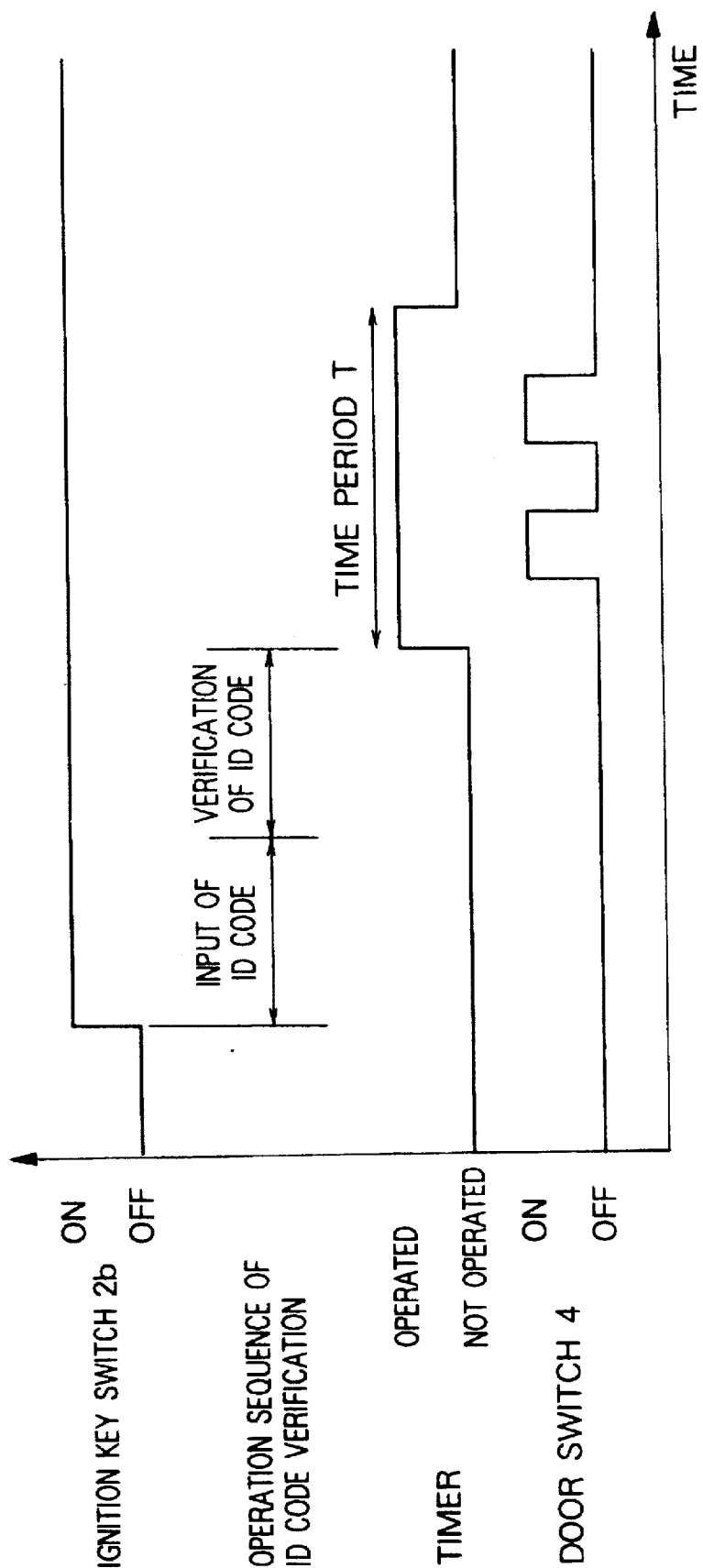
FIG. 3 is a timing chart for illustrating operation of the antitheft apparatus for a motor vehicle according to a second embodiment of the invention.

In the case of the antitheft apparatus according to the first embodiment of the invention, the engine starting operation is enabled when it is decided that the door is left opened regardless of a discrepancy between the ID code and the verification code. However, an arrangement can be adopted such that the engine starting operation is permitted when the door opening/closing operation is performed within a time set by a timer after the decision of discrepancy between the ID code and the verification code, as illustrated in FIG. 3. As can be seen from this figure, when it is decided that the opening/closing operation of the door switch 4 is performed within a time period T after completion of the ID code collating operation performed on the ID code as inputted in response to the change of the ignition key switch 2b from the OFF-position to the ON-position, the engine starting operation is enabled or permitted regardless of a discrepancy between the ID code and the verification code.

Figure 4:
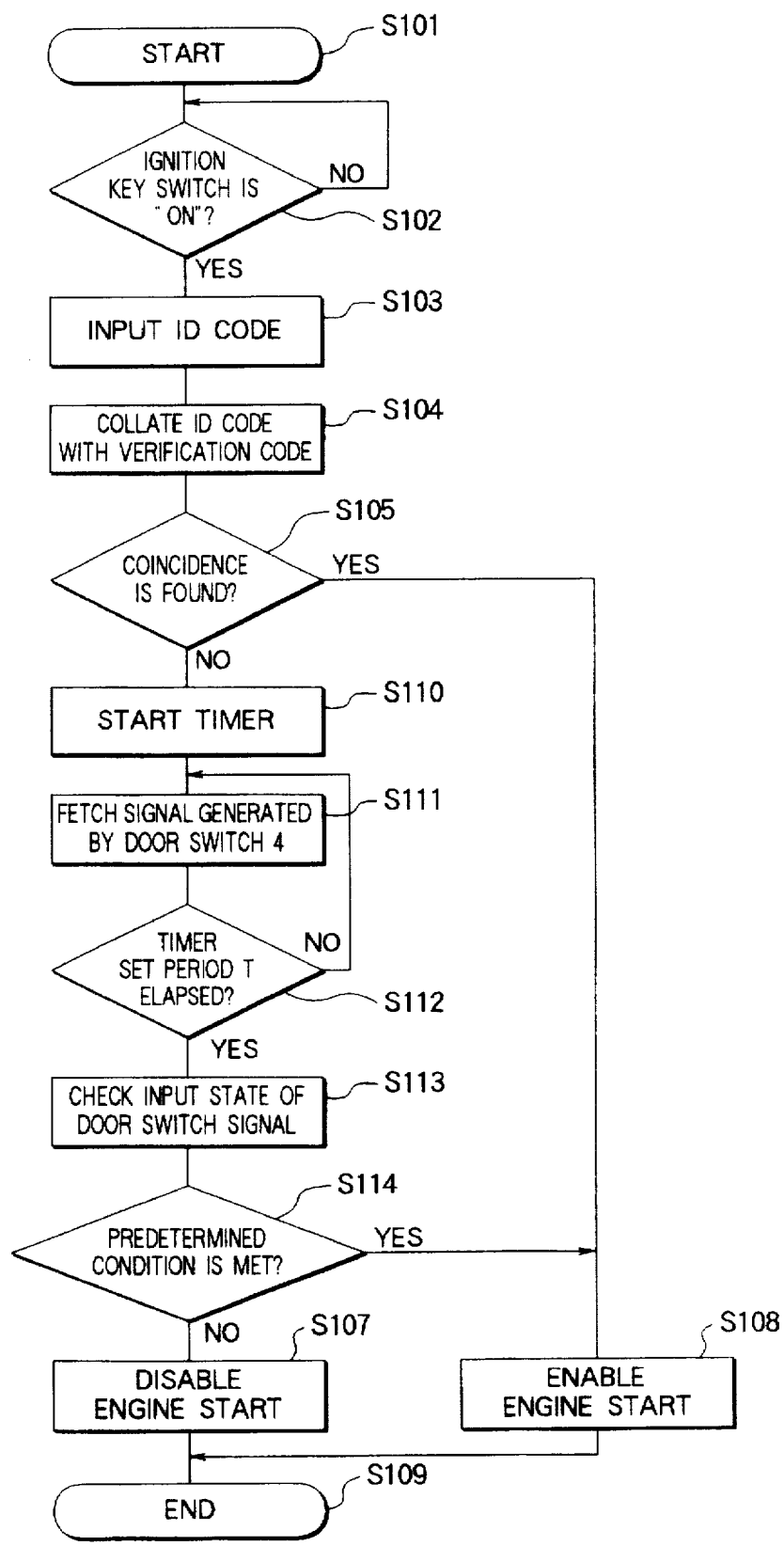
FIG. 4 is a flow chart for illustrating operation of the antitheft apparatus for a motor vehicle according to the second embodiment of the invention.

In the following, operation of the antitheft apparatus according to the instant embodiment of the invention will be described by reference to a flow chart of FIG. 4. Parenthetically, in FIG. 4, same reference numerals as those used in FIG. 2 indicate the same steps as described previously by reference to FIG. 2. When the ID code collation executed in the step S105 results in discrepancy, the processing proceeds to a step S110 where a time value T shown in FIG. 3 is programmed into a timer and a counting operation thereof is started.

Subsequently, in a step S111, the ON/OFF state of the door switch 4 is monitored by fetching the signal generated by the door switch 4. In a step S112, it is checked whether the time T set in the timer has elapsed or not. So long as the time T has not elapsed, the step S111 is resumed to thereby continue to monitor the state of the door switch 4 until the time T set in the timer has elapsed.

When it is detected in the step S112 that the time T set in the timer has elapsed, then the processing proceeds to a step S113 where it is checked whether the door switch 4 is operated within the time T set in the timer on the basis of the output of the monitoring step S111. In the case of the instant embodiment of the invention, it is presumed, only by way of example, that in order to enable the engine starting operation, the door of the automobile has to be opened twice within the time T set in the timer in FIG. 3, i.e., change in the door state has to occur twice within the time T. When it is decided in a step S114 that the presumed condition mentioned above is satisfied, the processing proceeds to a step S108 where the engine starting operation is enabled. On the contrary, when the above-mentioned condition is not fulfilled, the processing proceeds to the step S107 where the engine starting operation is disabled or inhibited.

As is apparent from the foregoing, according to the instant embodiment of the invention, when the door switch 4 which can arbitrarily be manipulated by the driver is opened and closed a predetermined number of times within a time period T preset in the timer, the engine of the automobile can be started even when the cylinder key 1 is lost, while ensuring secrecy and security of the engine starting procedure.

It should further be noted that the time T preset in the timer and the number of times the door switch 4 is required to be opened and closed for enabling the engine starting operation may be selected rather arbitrarily so far as the authorized user can thereby be identified. Additionally, it should be mentioned that although the door switch 4 is selected as the object for arbitrary manipulation of the driver, the invention is never restricted to the door switch 4 but any other objects which can be manipulated by the driver may be employed substantially to the same effect.

Embodiment 3

Figure 5:
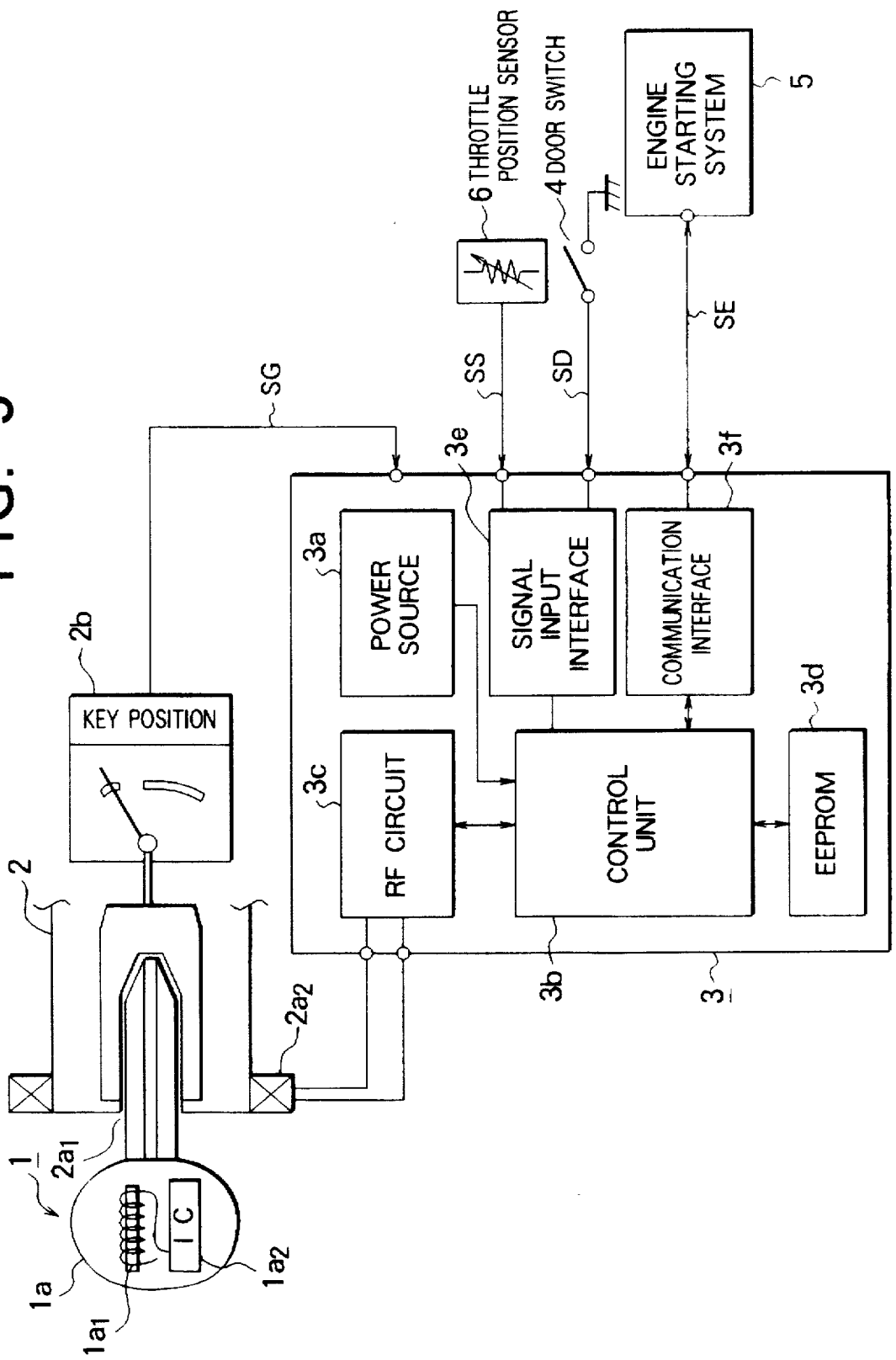
FIG. 5 is a block diagram showing a configuration of an antitheft apparatus for a motor vehicle according to a third embodiment of the present invention.

In the antitheft apparatus according to the second embodiment of the invention, the object for manipulation far enabling the engine starting operation while ensuring secrecy of the procedure therefor is restricted to the door switch 4. However, for securing more positive secrecy, manipulation of a throttle valve may be added as the object for manipulation. FIG. 5 is a block diagram showing a general arrangement of an antitheft apparatus for an automobile according to a third embodiment of the invention, in which like reference characters as those used in FIG. 1 denote same or equivalent parts and signals. Referring to FIG. 5, there is provided a throttle position sensor 6 for generating a voltage signal indicative of an opening degree of a throttle value (not shown) by detecting a depression stroke of an accelerator pedal (not shown either).

Figure 6:
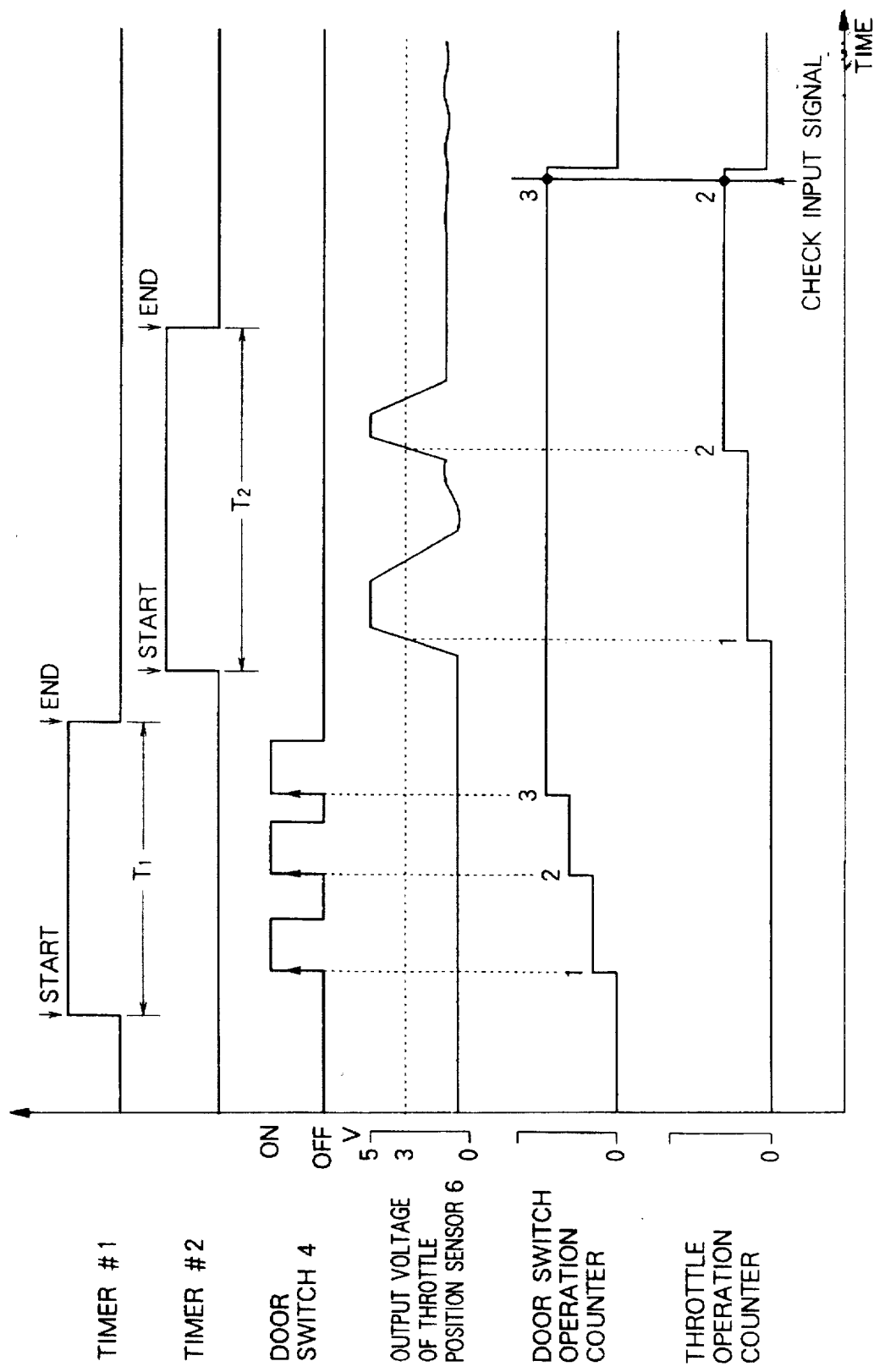
FIG. 6 is a timing chart for illustrating an engine starting operation processing executed by a control unit of the antitheft apparatus according to the third embodiment of the present invention.

FIG. 6 is a timing chart for illustrating an engine starting operation processing executed by a control unit 3b in an antitheft apparatus according to the instant embodiment of the present invention. More specifically, in the chart of FIG. 6, there are illustrated a counter operation for counting the number of times the door switch 4 is turned on (closed) and off (opened) in response to opening and closing of a door of an automobile (not shown) within a time period $T_1$ preset in a timer #1 and operation of a throttle actuation counter for counting the number of times the output voltage of the throttle position sensor 6 changes (e.g. exceeds a voltage level of three volts) within a time $T_2$ set in a timer #2.

More specifically, with the door switch counter, the number of times the door switch 4 is opened and closed (turned on and off) within a preset time period $T_1$ set in the timer #1 is counted. The count value is cleared upon elapse of the time set at the timer #1. In the case of the instant embodiment of the invention, it is required for enabling the engine starting operation that the door is opened and closed three times within the preset period $T_1$. Additionally, with the throttle actuation counter, the number of times the output voltage of the throttle position sensor 6 exceeds a predetermined reference voltage level e.g. of three volts during a time period $T_2$ preset in the timer #2 is counted. The count value of the throttle actuation counter is cleared upon every lapse of the preset time $T_2$. In the case of the instant embodiment, it is assumed, only by way of example, that the output voltage of the throttle position sensor 6 has to exceed the predetermined voltage level twice within the period $T_2$ set in the timer #2 in order to enable the engine starting operation.

Figure 7:
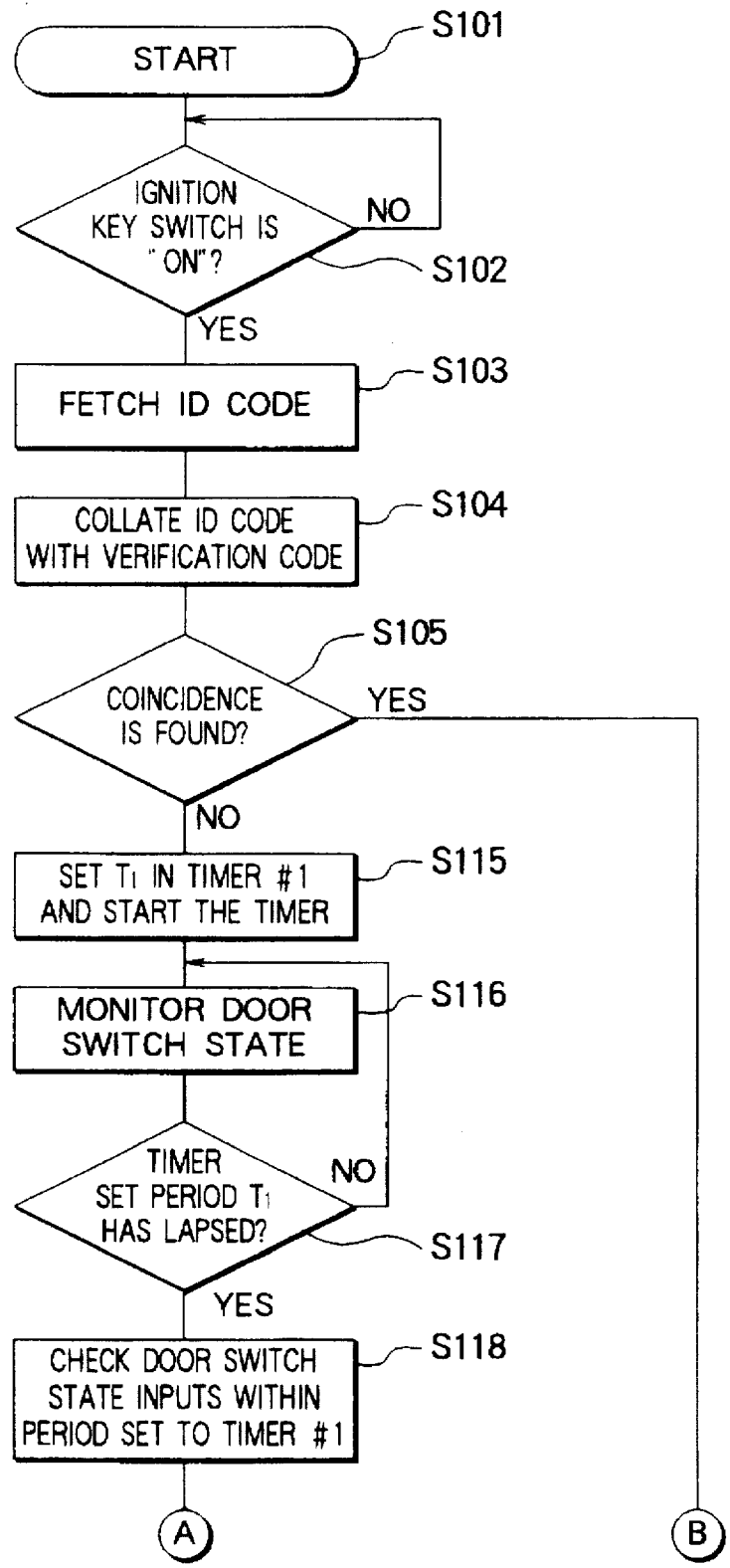
FIG. 7 is a flow chart for illustrating operation of the a antitheft apparatus for a motor vehicle according to the third embodiment of the invention.
Figure 8:
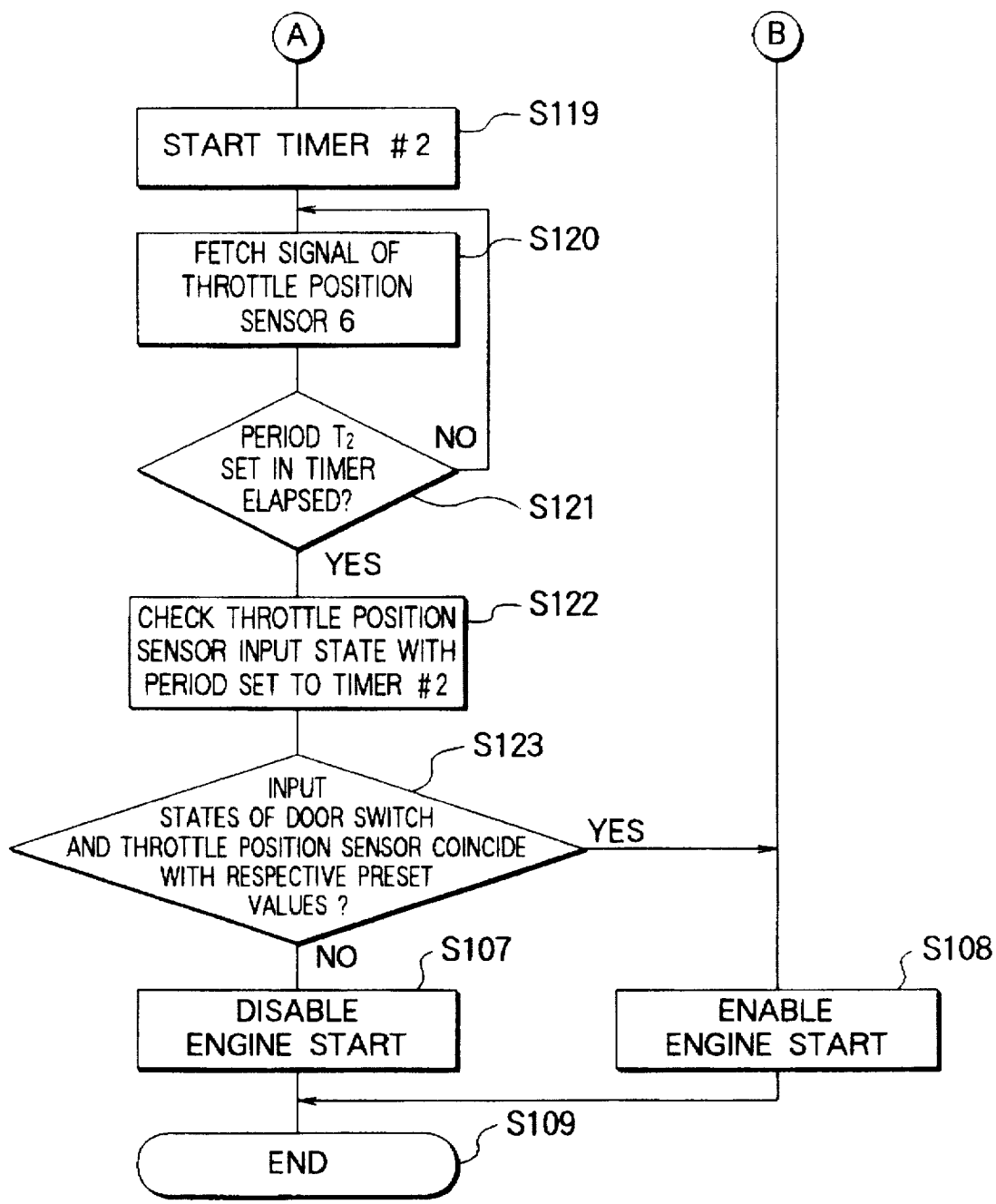
FIG. 8 is a flow chart for illustrating operation of the antitheft apparatus for a motor vehicle according to the third embodiment of the invention.

Next, operation of the antitheft apparatus according to the instant embodiment of the invention will be elucidated by reference to flow charts of FIGS. 7 and 8. Parenthetically, in FIGS. 7 and 8, same reference characters as those used in FIG. 4 indicate similar processing contents as described previously by reference to FIG. 4. When the ID code collation executed in the step S105 results in discrepancy, the processing proceeds to a step S115 where the time period $T_1$ shown in FIG. 6 is programmed into the timer #1 which is then started.

Subsequently, in a step S116, the contact state (ON/OFF) of the door switch 4 is monitored. In a step S117, it is checked whether the time period $T_1$ set in the timer #1 has elapsed or not. So long as the timer set period $T_1$ has not elapsed, the processing resumes the step S116 to thereby continue to monitor the state of the door switch 4 until the time $T_1$ set in the timer #1 has elapsed. When it is detected in the step S117 that the time $T_1$ set in the timer #1 has elapsed, then the processing proceeds to a step S118 where operation of the door switch 4 within the time $T_1$ set in the timer #1 is checked on the basis of the output of the monitoring step S116. More specifically, in the step S118, it is checked whether the door switch 4 is repeatedly opened and closed three times within the time period $T_1$, as can be seen from the time chart of FIG. 6.

Subsequently, in a step S119 shown in FIG. 8, the time period $T_2$ is set in the timer #2, whereupon the time counting operation is started. Subsequently, in a step S120, the output state of the throttle position sensor is monitored while in a step S121, lapse of the time set in the timer #2 is checked. So long as the time $T_2$ has not elapsed, the processing resumes the step S120 to thereby continue to monitor the output state of the throttle position sensor until the time $T_2$ set in the timer #2 has elapsed.

When it is detected in the step S121 that the time $T_2$ set in the timer #2 has elapsed, then the processing proceeds to a step S122 where it is checked whether the output voltage of the throttle position sensor 6 has exceeded the reference level of three volts twice within the time $T_2$ preset in the timer #2 on the basis of the output of the throttle position sensor. More specifically, in the step S123, it is checked whether the door switch 4 is repeatedly opened and closed three times within the time period $T_1$ as shown in FIG. 6 and whether the acceleration pedal is depressed twice within the preset time $T_2$ for changing the output value of the throttle position sensor 6, as illustrated in the timing chart of FIG. 6. When both the conditions mentioned above are satisfied, the processing proceeds to the step S108 and, if otherwise, to the step S107.

As will be appreciated from the foregoing description, by selecting the door switch 4 and the throttle valves as the objects which can be manipulated by the driver, it is possible to start the engine operation regardless of discrepancy between the ID code stored in the cylinder key 1 and the verification code stored in the ID code verification/control module 3 when the door switch 4 and the throttle valve are operated predetermined number of times within the time periods $T_1$ and $T_2$ preset, respectively.

Of course, the number of times the objects for manipulation are to be operated as well as the time limits imposed on the manipulations, respectively, are never restricted to the values mentioned above but can be set arbitrarily by the user. Thus, the secrecy and security of the engine starting procedure can further be enhanced by setting the number of times the objects of concern are to be manipulated and the time limits therefor.

Embodiment 4

Figure 9:
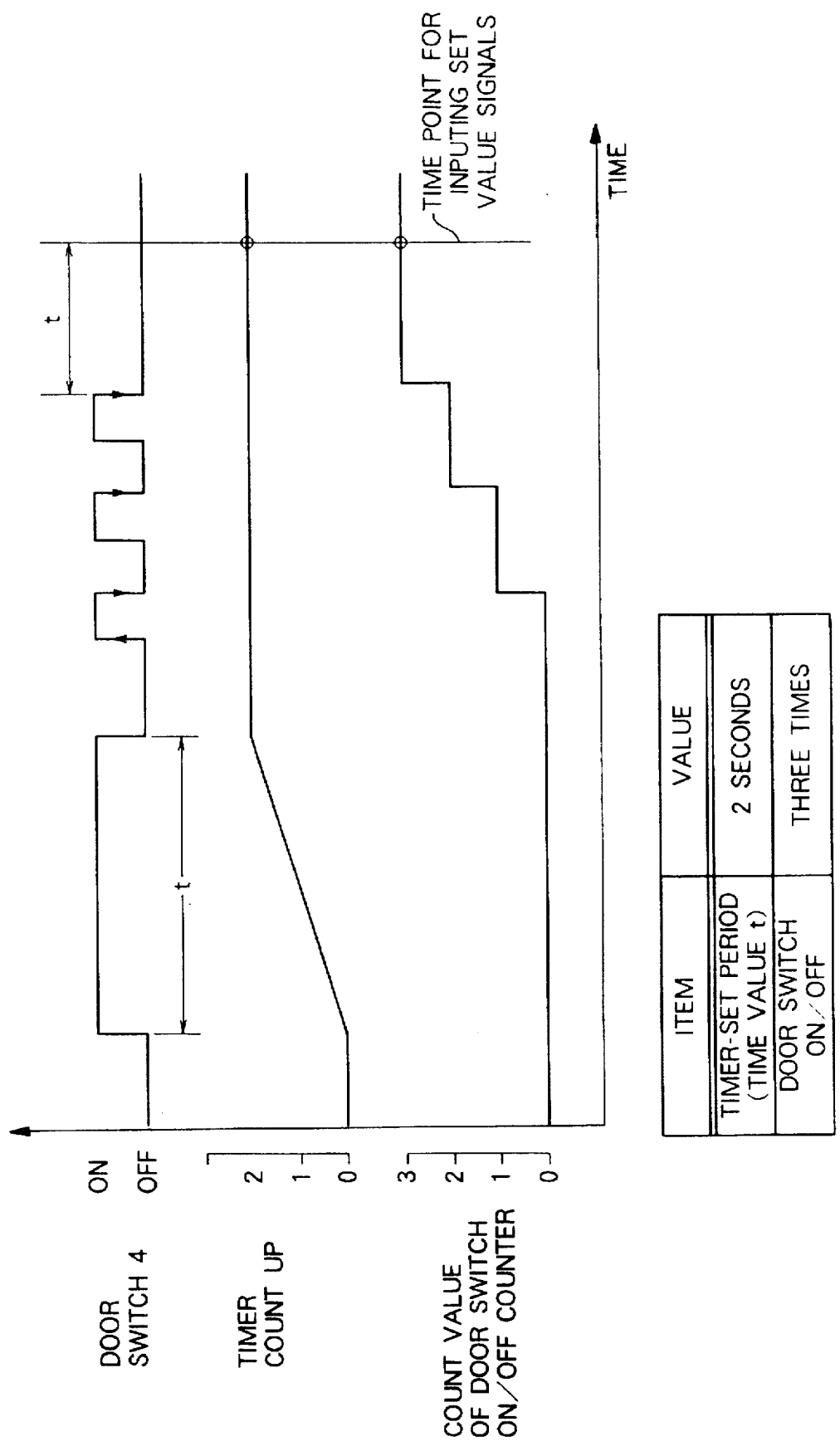
FIG. 9 is a timing chart for illustrating a method of setting a timer value and a predetermined number of times a door switch is turned on and off as the conditions for enabling engine starting operation in an antitheft apparatus according to a fourth embodiment of the invention.

A fourth embodiment of the present invention is directed to a method of setting a time limit for operation of the door switch 4 as well as a method of setting a predetermined number of times the door switch 4 is required to be turned on and off in order to allow the engine to be started. FIG. 9 is a timing chart for illustrating a method of setting a timer value t and a predetermined number of times the door switch 4 has to be turned on and off according to the invention. It is assumed, by way of example only, that the count-up or decrementing operation of the timer is started in response to a first closing operation of the door switch 4 while the count-up operation is stopped at a time point when the door switch 4 is opened and that the period intervening between the timer start and the timer stop is two seconds. In other words, the door-switch operation setting time or period is two seconds. More specifically, it is decided that the operation for setting the number of times the switch door 4 is to be turned on and off for enabling the engine operation to be started has been completed when the period during which the door switch 4 is opened (OFF) exceeds two seconds. Next, referring to flow charts of FIGS. 10 and 11, the instant embodiment of the invention will be described in detail.

In a step S105, the ID code stored in the cylinder key 1 is collated or compared with the verification code to verify whether the ID code is authorized or not. When the comparison results in a discrepancy, the processing proceeds to a step S109 to be terminated. On the other hand, when coincidence is found between the ID code and the verification code, the processing proceeds to a step S124, where a decision is made as to whether a signal input/set mode is validated for setting the door operation time (timer value t) and the prescribed number of switch ON/OFF operations of the door switch.

The decision step mentioned above can be executed by issuing a decision command to the control unit 3b of the ID code verification/control module 3 by using an appropriate fault diagnosis tool (not shown) for checking various controllers in automobile shops or like places. The control unit 3b responds to the decision command issued in the step S124 to make the decision whether the signal input/set mode is validated. Unless the signal input setting mode is validated, the processing proceeds to a step S109 and comes to an end. On the other hand, when it is decided that the signal input/set mode is validated, the processing proceeds to a step S125 where the operation state of the door switch 4 is decided on the basis of the ON signal input mentioned hereinbefore. When it is found from the ON signal that the door switch 4 is in the OFF state, the step S125 is resumed to repeat the check of the operation state of the door switch 4.

When the door switch 4 is in the ON-state, the processing proceeds to a step S126 where the timer value is counted up, as described previously by reference to FIG. 9. Subsequently, a step S127 is executed, where the operation state of the door switch 4 is checked again. When the door switch 4 is in the ON-state, the step S126 is resumed to continue the count-up of the timer.

On the other hand, when it is found that in the step S127 that the door switch 4 is in the OFF-state, the processing proceeds to a step S128 where the count-up operation of the timer is stopped. In this case, the timer value t taken for the door switch 4 to assume the OFF-state from the ON-state is set to two seconds in the case of the example illustrated in FIG. 9. This timer value t of two seconds represents the door operation setting time. More specifically, upon the lapse of two seconds, it is decided that the setting of number of the times the door switch is to be closed and opened (ON, OFF) has been completed.

Next, in a step S129, the timing or time point at which the state of the door switch 4 changes from "OFF" to "ON" is detected. In case the door switch 4 continues to be in the OFF-state without changing to "ON", the step S129 is repetitively executed to wait for the change of the switch state to "ON". When the state of the door switch 4 changes to "ON", then a step S130 is executed to decide whether the door switch 4 continues to be in the ON-state. If so, the step S130 is executed repetitionally to check the state of the door switch 4.

Upon changing of the state of the door switch 4 to "OFF", the processing proceeds to a step S131 where an ON/OFF counter is allowed to count up, as is illustrated in the time chart of FIG. 9. Subsequently, the processing proceeds to a step S132 where an OFF-timer is started for making the decision that the setting of the number of times the door switch 4 is to be manipulated has been completed. More specifically, in a step S133, a decision is made as to whether or not the timing value t of the OFF-timer exceeds the preset timer value t of two seconds. If the preset value t is exceeded, a decision is made that the setting has been completed, whereupon the processing proceeds to the step S109.

If the setting has not been completed yet, a step S134 is executed to decide whether the state of the door switch 4 has changed from "OFF" to "ON". When this decision step S134 results in affirmation "YES", the step S130 is resumed to repeat execution of the processing routine mentioned above. On the other hand, when the result of the decision step S134 is negative "NO", the processing proceeds to a step S135 where the time value of the OFF-timer started in the step S132 is incremented, whereupon the step S133 is executed again. This processing routine is repetitively executed. In the case of the example illustrated in the time chart of FIG. 9, the set value for the ON/OFF counter for the door switch 4 is set three times.

Although it is presumed in the forgoing description that the setting of the values of concern as well as alteration thereof can be performed any number of times and that it can be altered, it should be appreciated that this number may be limited by providing a setting number counter.

Furthermore, an arrangement may be adopted such that a limitation is imposed on the number of times the door switch 4 can be manipulated for enabling the engine starting operation in the case where the ID code does not coincide with the verification code.

Embodiment 5

Figure 10:
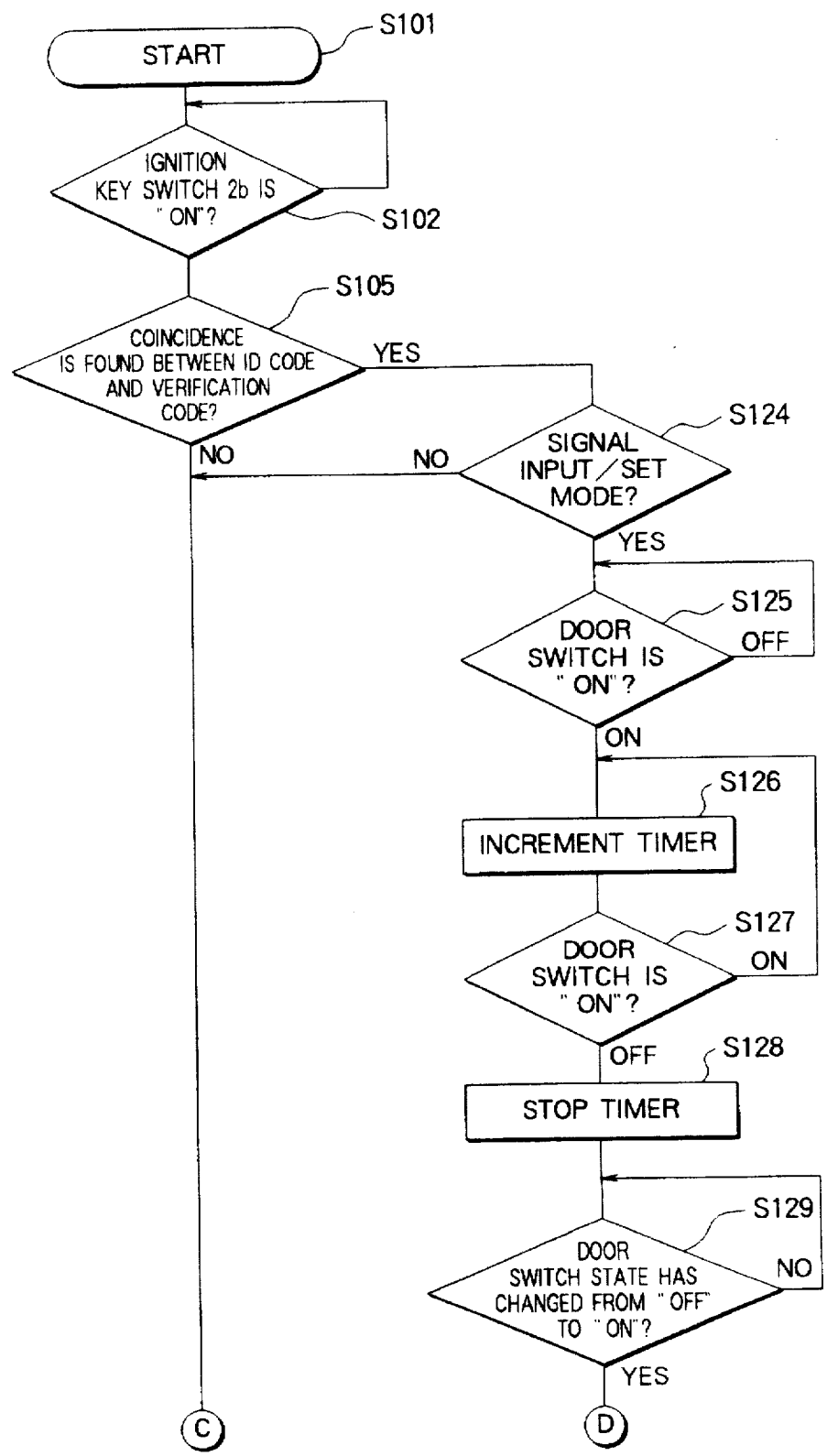
FIG. 10 is a flow chart for illustrating operation setting the timing value and the predetermined number of manipulations in the antitheft apparatus according to the fourth embodiment of the invention.
Figure 11:
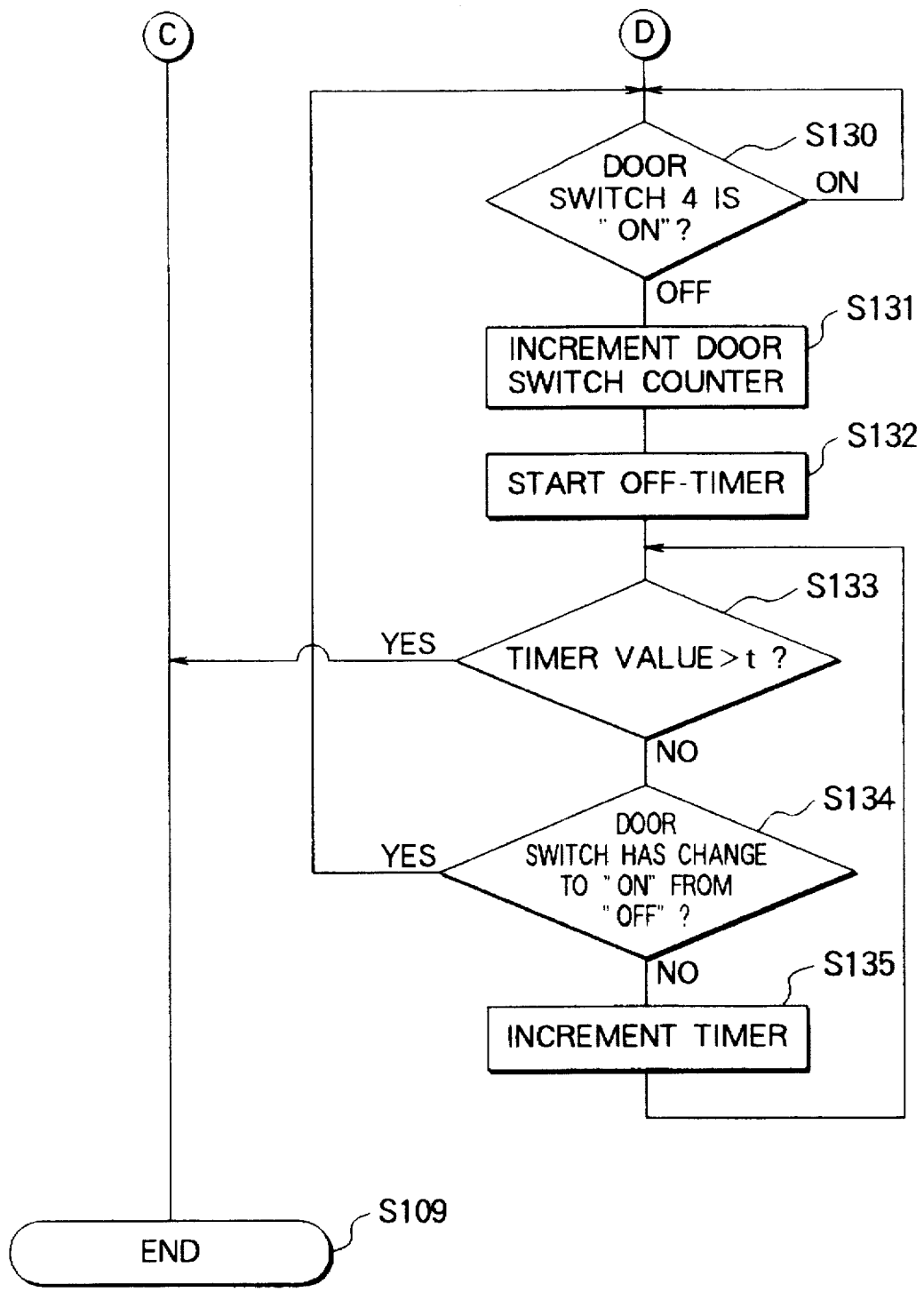
FIG. 11 is a flow chart for illustrating operation setting the timing value and the predetermined number of manipulations in the antitheft apparatus according to the fourth embodiment of the invention.
Figure 12:
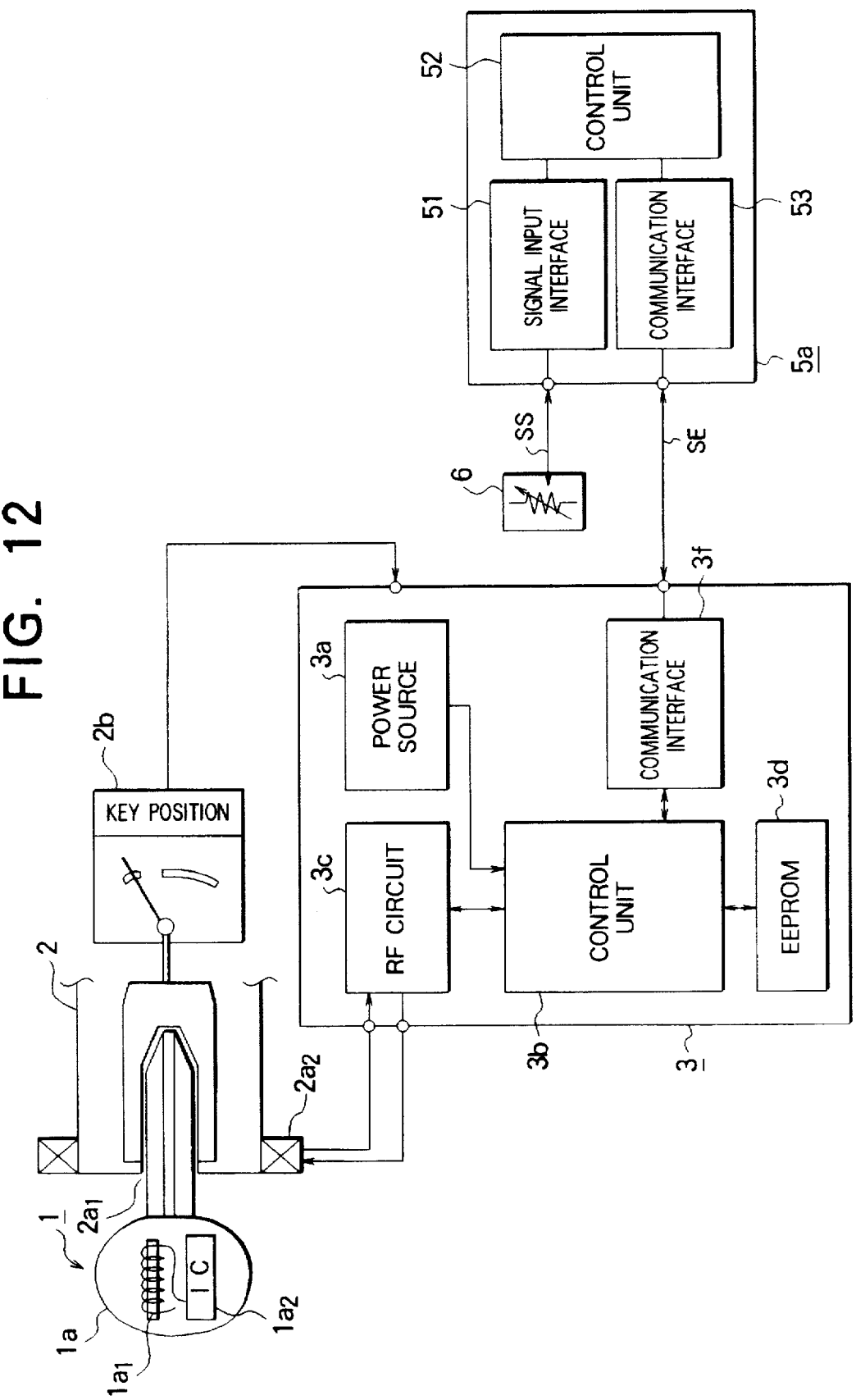
FIG. 12 is a block diagram showing a structure of an antitheft apparatus according to a fifth embodiment of the present invention.

In the case of the preceding embodiments, the control unit 3b of the ID code verification/control module 3 is adapted to perform not only the collation of the ID code but also the engine start enable/disable decision. However, a manipulation signal may be inputted to the module 3 through communication from an engine starting system which is designed to receive the manipulation signal for the engine start enable/disable decision. FIG. 12 is a block diagram showing an antitheft apparatus according to a fifth embodiment of the present invention. Parenthetically, same reference symbols as used in the foregoing denote like or equivalent parts and signals. Referring to FIG. 10, there is provided according to the instant embodiment of the invention an engine starting system 5a which includes a control unit 52 to which a sensor signal SS of the throttle position sensor 6 is supplied through a signal input interface 51 as an engine start signal. The control unit 52 then transmits the sensor signal SS to the control unit 3b of the ID code verification/control module 3 via a communication interface 53.

Upon reception of the sensor signal SS, the control unit 3b of the ID code verification/control module 3 makes a decision on the basis of the sensor signal SS whether the output signal of the throttle position sensor 6 changes to values exceeding e.g. a level of 3 volts three times within a preset time period. If so, the control unit 3b issues the engine start enable signal SE to the engine starting system 5a.

Many modifications and variations of the present invention are possible in the light of the above techniques. It is therefore to be understood that within the scope of the appended claims, the invention may be practiced otherwise than as specifically described.

What is claimed is:

1. An apparatus for protecting an automobile against unauthorized operation, comprising:

an engine starting key incorporating storage means for storing an identification code allocated inherently to said automobile;

socket means mounted on said automobile for receiving said engine starting key;

code reading means provided in association with said socket means for reading out said identification code from said engine starting key inserted in said socket means;

code collating means for collating said identification code supplied from said code reading means with a verification code stored previously;

manipulation detecting means for detecting whether or not said automobile is manipulated in a predetermined manner, and for generating a predetermined manipulation signal when said automobile is manipulated in said predetermined manner;

engine starting means for starting operation of an engine of said automobile; and engine start decision means for enabling said engine starting means to start operation of said engine in response to an output of said code collating means which indicates that said identification code coincides with said verification code and, when said output of said code collating means indicates a discrepancy between said identification code and said verification code, for enabling said engine starting means to start operation of said engine only when said predetermined manipulation signal is generated by said manipulation detecting means.

2. An automobile protecting apparatus according to claim 1, wherein upon a decision of said discrepancy between said identification code and said verification code, said engine start decision means generates the engine start enable signal when at least two different types of automobile manipulation signals are issued by said manipulation detecting means.

3. An automobile protecting apparatus according to claim 2, wherein said engine start decision means imposes a time limit of generation of each of said automobile manipulation signals to thereby generate an engine start enable signal to said engine starting means only when each of said automobile manipulation signals is generated within said time limit.

4. An automobile protecting apparatus according to claim 1, wherein said manipulation detecting means includes door switch means provided in association with a door of said automobile for detecting opening and closing of said door.

5. An automobile protecting apparatus according to claim 1, wherein said manipulation detecting means includes throttle a position sensor for detecting actuation of an accelerator pedal of said automobile.

6. An automobile protecting apparatus for protecting an automobile from unauthorized operation, comprising:

an engine starting key incorporating storage means for storing an identification code allocated inherently to said automobile;

socket means mounted on said automobile for receiving said engine starting key;

code reading means provided in association with said socket means for reading out said identification code from said engine starting key inserted in said socket means;

code collating means for collating said identification code supplied from said code reading means with a verification code stored previously;

manipulation detecting means for detecting whether or not said automobile is manipulated in a predetermined manner, and for generating a predetermined manipulation signal when said automobile is manipulated in said predetermined manner;

timer means for setting a predetermined time limit;

engine starting means for starting operation of an engine of said automobile; and engine start decision means for enabling said engine starting means to start operation of said engine in response to an output of said code collating means which indicates that said identification code coincides with said verification code and, when said output of said code collating means indicates a discrepancy between said identification code and said verification code, for enabling said engine starting means to start operation of said engine only when said predetermined manipulation signal is generated by said manipulation detecting means within said predetermined time limit set at said timer.

7. An automobile protecting apparatus according to claim 6, wherein a number of times said automobile is manipulated in said predetermined manner after decision said indication of said discrepancy between said identification code and said verification code is limited to a predetermined number.

8. An automobile protecting apparatus according to claim 6, wherein said manner of said manipulation of said automobile and said time limit can be determined arbitrarily and set in said engine start decision means.

9. An automobile protecting apparatus according to claim 8, wherein said manner of said manipulation of the automobile and said time limit can be determined arbitrarily and set in said engine start decision means when a coincidence between said identification code and said verification code is decided.

10. An automobile protecting apparatus according to claim 8, wherein the number of times the manner of said manipulation and said time limit can be set said in engine start decision means is limited to a predetermined number.

11. An automobile protecting apparatus for protecting an automobile against unauthorized operation, comprising:

an engine starting key incorporating storage means for storing an identification code allocated inherently to said automobile;

socket means mounted on said automobile for receiving said engine starting key;

code reading means provided in association with said socket means for reading out said identification code from said engine starting key inserted in said socket means;

code collating means for collating said identification code supplied from said code reading means with a verification code stored previously;

manipulation detecting means for detecting whether or not said automobile is manipulated in a predetermined manner, and for generating a predetermined manipulation signal when said automobile is manipulated in said predetermined manner;

engine starting means for starting operation of an engine of said automobile, said engine starting means comprising said manipulation detecting means;

communication means for transmitting an output of said manipulation detecting means; and engine start decision means for enabling said engine starting means to start operation of said engine in response to an output of said code collating means which indicates that said identification code coincides with said verification code and, when said output of said code collating means indicates a discrepancy between said identification code and said verification code, for enabling said engine starting means to start operation of said engine only when said predetermined manipulation signal is received from said manipulation detecting means.

\* \* \* \* \*